United States Patent [19]
Fisher

[11] Patent Number: 6,050,372
[45] Date of Patent: Apr. 18, 2000

[54] TAMPER-RESISTANT BRAKE ACTUATOR AND METHOD OF MAKING THE SAME

[75] Inventor: Albert Fisher, Lattarpe, Kans.

[73] Assignee: Haldex Brake Corporation, Kansas City, Mo.

[21] Appl. No.: 09/044,050

[22] Filed: Mar. 18, 1998

[51] Int. Cl.[7] .................................................. F16D 65/24
[52] U.S. Cl. ...................................... 188/170; 188/153 R
[58] Field of Search .................................... 188/170, 365, 188/366, 367, 368, 153 R, 153 D, 153 A

[56] References Cited

U.S. PATENT DOCUMENTS

| | | |
|---|---|---|
| 1,952,201 | 3/1934 | Flammang et al. . |
| 3,701,377 | 10/1972 | Fisher . |
| 3,701,378 | 10/1972 | Graham . |
| 3,927,711 | 12/1975 | Fisher et al. . |
| 3,990,501 | 11/1976 | Fisher et al. . |
| 4,960,036 | 10/1990 | Gummer et al. . |
| 5,062,455 | 11/1991 | Schurter et al. . |
| 5,193,432 | 3/1993 | Smith . |
| 5,285,716 | 2/1994 | Thompson . |
| 5,315,918 | 5/1994 | Pierce . |
| 5,353,688 | 10/1994 | Pierce et al. ............................ 188/170 |
| 5,433,138 | 7/1995 | Choinski et al. . |

FOREIGN PATENT DOCUMENTS

| | | |
|---|---|---|
| 2000225 | 1/1979 | United Kingdom . |

*Primary Examiner*—Matthew C. Graham
*Attorney, Agent, or Firm*—St. Onge Steward Johnston & Reens LLC

[57] ABSTRACT

The present invention provides a brake actuator containing a spring and including a flange case having an outwardly facing receptacle, and a head having an inwardly facing receptacle. The head fits over the flange case such that the inwardly facing receptacle corresponds to the outwardly facing receptacle, and the actuator also includes a key positioned within the receptacles, whereby the head is rigidly secured to the flange case. According to one embodiment, the inwardly facing receptacle comprises a plurality of spaced-apart dimples, and the outwardly facing receptacle comprises a continuous, annular groove. According to another embodiment, the flange case includes an outwardly facing groove above the outwardly facing receptacle, and the brake actuator further includes a diaphragm having an outer periphery clamped within the groove in an airtight manner by the head. The present invention also provides a method of securing a head of a brake actuator to a flange case of the brake actuator. The method includes the steps of providing the head with an inwardly facing receptacle, and the flange case with an outwardly facing receptacle. The head is positioned onto the flange case such that the inwardly facing receptacle corresponds to the outwardly facing receptacle. Then the inwardly and the outwardly facing receptacles are substantially filled with molten material, and the molten material is allowed to harden. According to one embodiment, the molten material is injected into the receptacles under pressure.

16 Claims, 3 Drawing Sheets

6,050,372

TAMPER-RESISTANT BRAKE ACTUATOR AND METHOD OF MAKING THE SAME

FIELD OF THE INVENTION

The present invention relates generally to braking systems and, more specifically, to brake actuators. Even more particularly, the present invention relates to a tamper-resistant spring brake actuator and a method of making the same.

BACKGROUND OF THE INVENTION

Fluid-operated braking systems have long been used to control the movement of motor vehicles in a safe and effective manner. In particular, air brakes are commonly used on commercial vehicles such as trucks, which typically have large gross vehicle weights. The considerable inertial mass of these heavy-duty vehicles in combination with the high speeds at which they travel requires a braking system which responds rapidly with substantial braking power. One system component which is instrumental in the operation of air brake systems is the brake actuator, which provides the force necessary when braking a vehicle.

In a typical double diaphragm spring brake actuator, a barrel-shaped power spring stores potential energy and exerts the large force required for braking in case of air pressure failure. Air pressure acting on a diaphragm compresses the power spring and maintains it in its brake release position. When the air is exhausted, the power spring acts on the diaphragm, typically an elastomeric diaphragm or a piston, and thereby applies the brakes in case of failure of the system air pressure.

The power spring is positioned in a spring chamber, which is typically formed by clamping an elastomeric diaphragm between a head (sometimes also known as a spring housing or spring chamber) and a flange case (sometimes known as an adaptor). The power spring is compressed within the spring chamber between the head and the diaphragm. The power spring has a high spring constant and is normally compressed to a height of less than 3 inches from an original uncompressed height of from 9 to 12 inches. The power spring, therefore, stores a substantial amount of potential energy, usually exerting a force on the head of about 2,000 to 3,000 pounds.

Unauthorized removal of the head, therefore, could be dangerous due to the large potential energy of the power spring. In addition, unauthorized replacement of the head could result in a poor diaphragm seal or other internal defects. Therefore, it is conventional to discourage unauthorized removal and replacement of the head by attaching a warning label and/or providing a securing means which is tamper-resistant or at least tamper-evident, such that a new securing means, not readily available to unauthorized personnel is required before the head can be reattached.

Various approaches have been heretofore proposed for securing the brake actuator head to the flange case to prevent improvident disassembly of the two parts. GB Patent No. 2,000,225, for example, discloses a brake actuator including a head secured to a flange case with a circlip. The circlip is seated in an inwardly facing groove of the flange case and extends over an annular lip of the head, such that the head can only be separated from the flange case by deforming or destroying the flange case. The circlip, however, is accessible from between the flange case and an edge of the head and, therefore, could possibly be tampered with.

The '225 patent also discloses a brake actuator including a head having a lower edge that is spun, or inelastically deformed, over a flange case, such that the head can only be separated from the flange case by deforming or destroying the lower edge of the head. The inelastically deformed edge, however, is accessible and, therefore, could possibly be tampered with.

U.S. Pat. No. 4,850,263 discloses a brake actuator including a head having an annular lip spun, or inelastically deformed, over a flange of a flange case, such that the head can only be separated from the flange case by deforming or destroying the lip and thus the head. The inelastically deformed annular lip, however, is accessible and, therefore, could possibly be tampered with.

U.S. Pat. No. 5,285,716 discloses a brake actuator having a head and a flange case welded together in a tamper-proof manner. As disclosed in the patent, however, since the weld is accessible it is a relatively easy task to grind away the weld to remove the head. In addition, the flange case must be made of steel in order to be welded to the steel head. Flange cases are normally made of aluminum.

U.S. Pat. No. 5,315,918 discloses a brake actuator including a head screwed onto a flange case and secured with an insert or a pin creating an interference fit. The insert or pin may be welded in place, but again, both are accessible and, therefore, could possibly be tampered with.

What is still needed, therefore, is a tamper-resistant spring brake actuator having a head secured to a flange case such that unauthorized removal of the head is discouraged, prevented and evidenced. Preferably, means employed to secure the head to the flange case will be substantially inaccessible to further reduce the possibility of removing the head from the flange case.

SUMMARY OF THE INVENTION

A general object of the present invention, accordingly, is to provide a tamper-resistant brake actuator.

A more specific objective of the present invention is to provide a tamper-resistant spring brake actuator having a head secured to a flange case such that unauthorized removal of the head is discouraged, prevented and evidenced.

Another objective of the present invention is to provide a tamper-resistant spring brake actuator having substantially inaccessible means securing the head to the flange case.

The present invention meets these and other objects by providing a tamper-resistant brake actuator containing a spring and including a flange case having an outwardly facing receptacle and a head having an inwardly facing receptacle. The head fits over the flange case such that the inwardly facing receptacle corresponds to the outwardly facing receptacle, and the actuator also includes a key positioned within the receptacles, whereby the head is rigidly secured to the flange case. Since the key is contained within the receptacles, it is substantially inaccessible and, therefore, less likely to be tampered with.

According to one aspect of the present invention, the inwardly facing receptacle comprises a plurality of spaced-apart dimples, and the outwardly facing receptacle comprises a continuous, annular groove.

According to another aspect of the present invention, the flange case includes an outwardly facing channel above the outwardly facing receptacle. The brake actuator further includes a diaphragm having an outer o-ring clamped within the channel in an airtight manner by the head.

The present invention also provides a method of securing a head of a brake actuator to a flange case of the brake actuator. The method includes the steps of providing the head with an inwardly facing receptacle, and the flange case with an outwardly facing receptacle. The head is positioned onto the flange case such that the inwardly facing receptacle corresponds to the outwardly facing receptacle. Then the inwardly and the outwardly facing receptacles are substantially filled with molten material, and the molten material is allowed to harden.

According to one aspect of the present invention, the molten material is metal.

According to another aspect of the present invention, the molten material is injected into the receptacles under pressure.

According to an additional aspect of the present invention, the actuator includes a power spring contained between the head and the flange case, with the power spring tending to push the head and the flange case apart. The method further includes the step of applying sufficient force to hold the head to the flange case until the molten material hardens.

The invention and its particular features and advantages will become more apparent from the following detailed description considered with reference to the accompanying drawings.

DETAILED DESCRIPTION OF THE INVENTION

Figure 1:
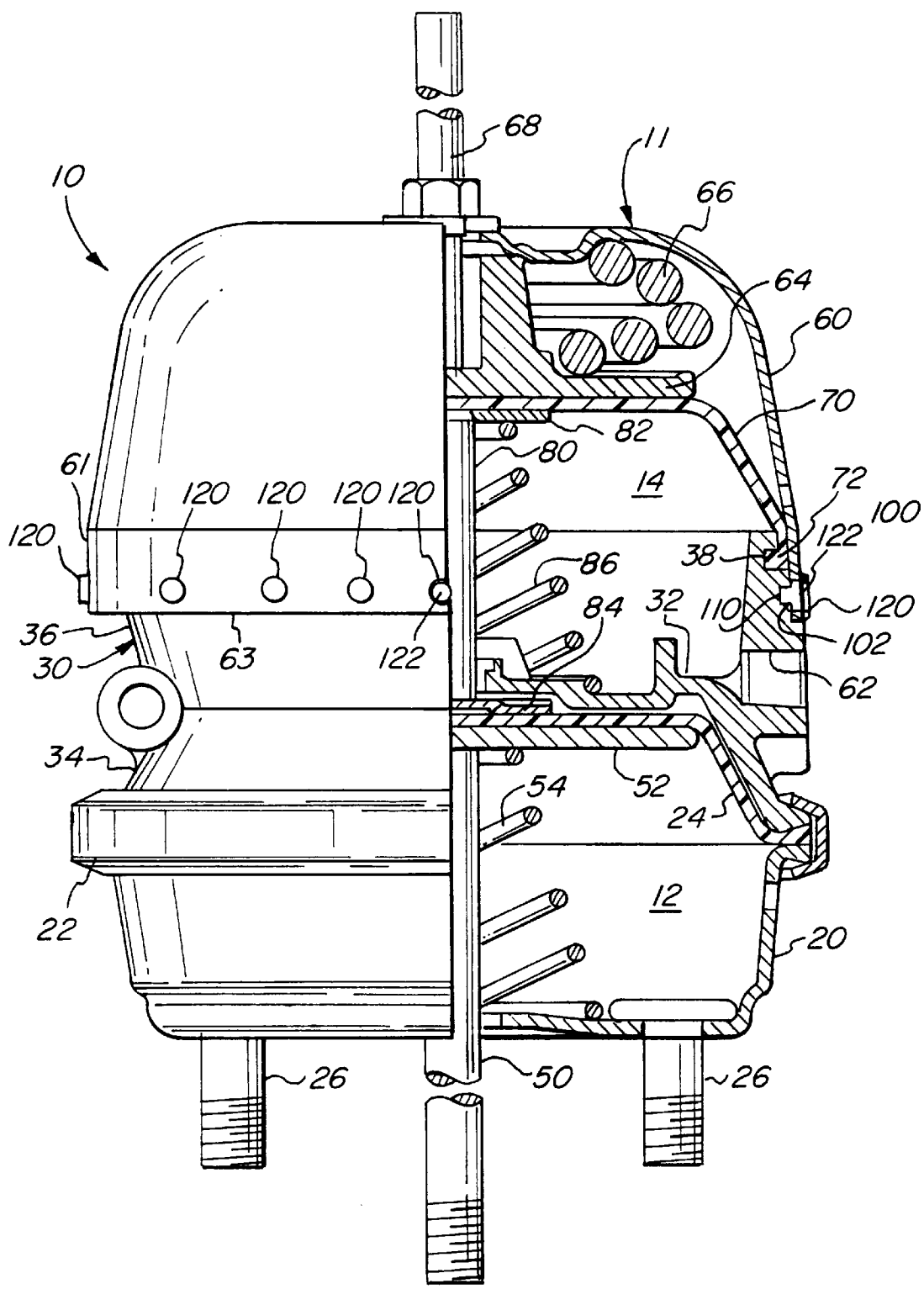
FIG. 1 is a side elevation view, partially in section, of a tamper-resistant brake actuator according to the present invention.
Figure 2:
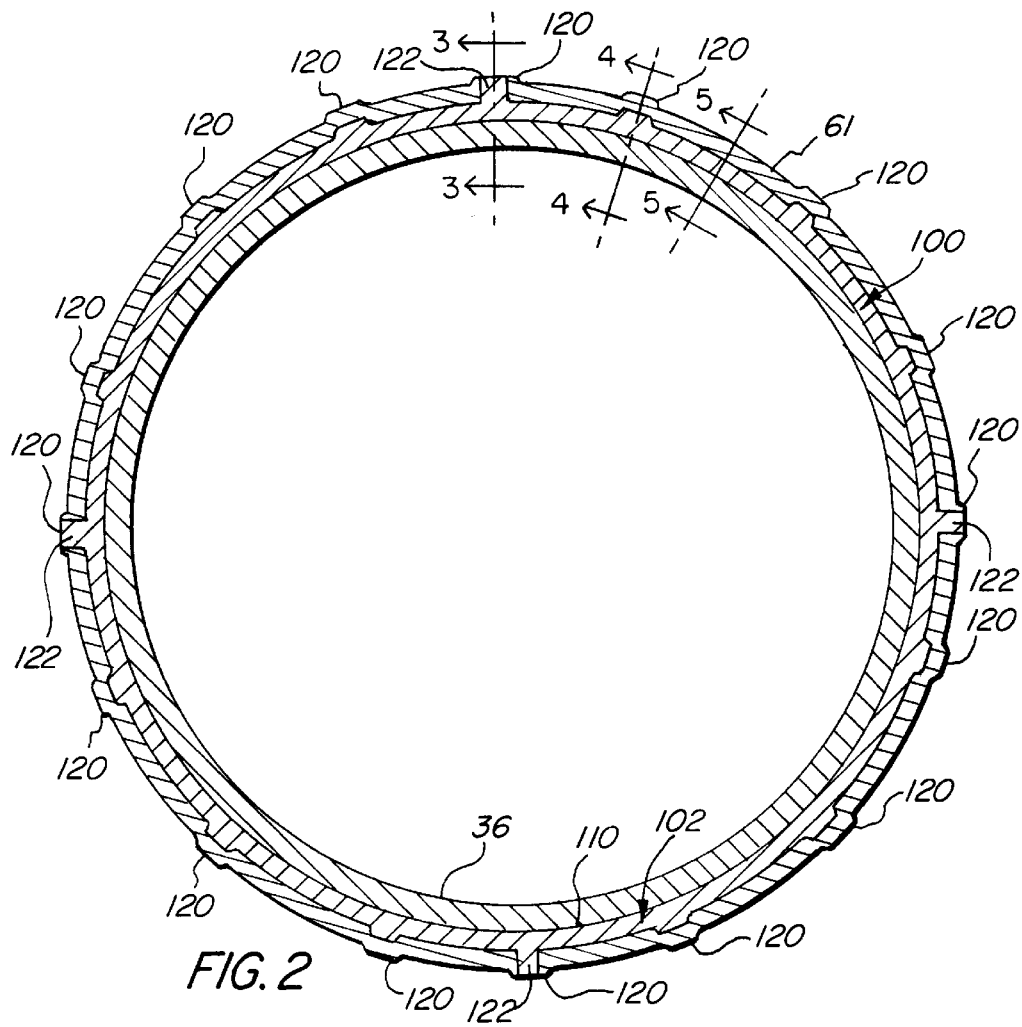
FIG. 2 is a sectional view, taken along line 2—2 in FIG. 1, of a substantially inaccessible key between a head and a flange case of the brake actuator.
Figure 3:
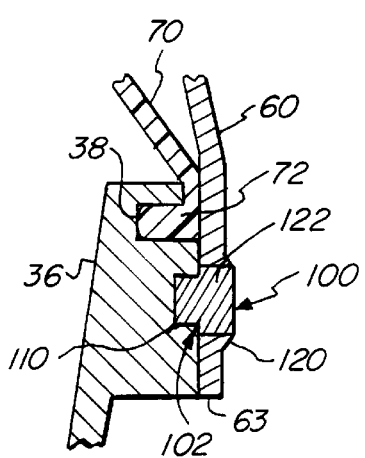
FIG. 3 is an enlarged sectional view, taken along line 3—3 in FIG. 2, of the key.
Figure 4:
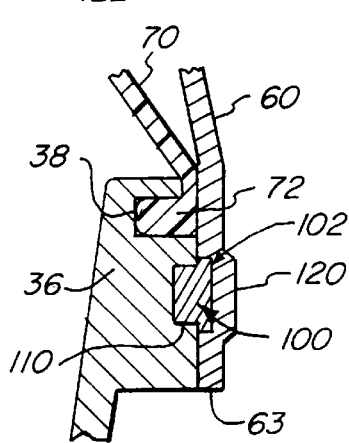
FIG. 4 is an enlarged sectional view, taken along line 4—4 in FIG. 2, of the key.
Figure 5:
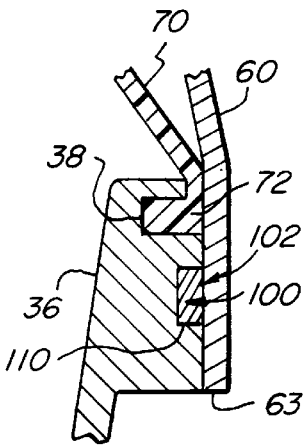
FIG. 5 is an enlarged sectional view, taken along line 5—5 in FIG. 2, of the key.

Referring to FIGS. 1 through 5, there is shown a brake actuator 10 according to the present invention. The embodiment shown is an air-operated dual diaphragm spring brake actuator 10, which includes a housing 11 containing a service chamber 12 and a spring chamber 14 in tandem. The service chamber 12 is defined by a cup-shaped service housing 20 and a flange case 30. The flange case 30 is double cup-shaped and includes a divider wall 32 separating a service side 34 of the flange case from a spring side 36 of the flange case. The service housing 20 is secured to the service side 34 of the flange case 30 using a conventional bolted clamp 22. An elastomeric service brake diaphragm 24 is clamped in fluid tight engagement between the service housing 20 and the service side 34 of the flange case 30. Although not shown, an aperture is provided in the flange case 30 for providing communication between a source of compressed air and a portion of the service chamber 12 between the diaphragm 24 and the divider wall 32 of the flange case 30.

A service push rod 50 extends through the service housing 20 into the service chamber 12, and mounts a service push rod plate 52 at an inner end thereof. The service push rod 50 has a threaded outer end for connection to the braking system of a vehicle. In addition, bolts 26 are provided for mounting the service housing 20 to the vehicle. A service return spring 54 extends between the service housing 20 and the service push rod plate 52 to bias the service push rod plate 52 and thus the service push rod 50 into the service chamber 12 to release the brake. The spring biased service push rod plate 52 normally forces the service brake diaphragm 24 against the divider wall 32 of the flange case 30 in the brake release position.

When air pressure is supplied through the aperture in the service side 34 of the flange case 30 as, for example, when the brakes are applied by a vehicle operator, compressed air is introduced between the service brake diaphragm 24 and the divider wall 32, thereby forcing the diaphragm toward the service housing 20. In this manner, the service push rod 50 is extended outwardly of the service chamber 12 to apply braking pressure to the vehicle brakes in a conventional fashion.

The spring chamber 14 is defined by the spring side 36 of the flange case 30 and a head 60. The head 60 includes a lower edge 63 and a collar 61 extending from the lower edge. The collar 61 tightly fits over, and is secured to, a portion of the spring side 36 of the flange case 30, as described below in detail. A spring diaphragm 70 has a periphery 72 clamped in an outwardly facing annular groove 38 of the flange case 30, in a fluid tight manner, by the collar 61 of the head.

An aperture 62 is provided within the spring side 36 of the flange case 30 to connect a portion of the spring chamber 14 between the dividing wall 32 and the spring diaphragm 70 with a source of compressed air (not shown). A flange case push rod 80 extends between the spring chamber 14 and the service chamber 12, and has a first reaction plate 82 rigidly mounted to one end, and a second reaction plate 84 mounted to the other end thereof. A return spring 86 is mounted within the spring chamber 14 between the divider wall 32 and the first reaction plate 82 to bias the flange case push rod 80 into the release position.

A pressure plate 64 bears against the spring diaphragm 70, and a power spring 66 is positioned between the pressure plate and the head 60 to bias the pressure plate and the push rods 50, 80 to a brake actuating position. The flange case 30 is typically cast aluminum and the head 60 is typically stamped or spun low-carbon steel. The actuator 10 may include a release tool 68 that extends within the head 60 for mechanically drawing the pressure plate 64 against the head 60 such that the power spring 66 assumes a retracted or "caged" position. The release tool 68 can thus mechanically release the brake after a loss of power or air pressure, as is known in the art.

In operation, air pressure is continually supplied to the spring chamber 14 through the aperture 62 to maintain the spring diaphragm 70 in a position to compress the power spring 66. In this position, the service push rod 50 normally is operated as described above by selective pressurization of air into the service chamber 12. However, in the event of failure of the air pressure system, the pressure in the spring chamber 14 will be decreased so that the service return spring 54 and flange case return spring 86 would no longer be able to overcome the pressure of the much larger and stronger power spring 66. Thus, the pressure plate 64 forces the spring diaphragm 70, and thus the flange case push rod 80 outwardly, thereby also forcing the service push rod 50 outwardly to apply braking pressure to the brakes.

The power spring 66, therefore, must be compressed between the pressure plate 64 and the head 60 during normal driving and normal service brake mode, as shown in FIG. 1. In these modes, the power spring 66 exerts substantial force on head 60 in the direction away from flange case 30, such that improvident or unauthorized removal of the head could cause the head to separate from the flange case with considerable force.

The present invention prevents, discourages and evidences improvident removal of the head 60 by providing a substantially inaccessible key 100 that secures the head to the flange case 30. To accept the key 100, the spring side 36 of the flange case 30 is provided with an outwardly facing receptacle 110, while the collar 61 of the head 60 is provided with an inwardly facing receptacle 120 that aligns with, or is adjacent to, the outwardly facing receptacle when the head is positioned on the flange case. Thus the inwardly and the outwardly facing receptacles 110, 120 define a channel 102. The key 100 substantially fills the channel 102 to provide an interference fit that prevents the head 60 from being pushed or pulled off of the flange case 30 in an axial direction. It should be noted that the collar 61 of the head 60 is provided with enough hoop strength of its own such that the collar will not be radially deformed, whether evenly or unevenly, by the force of the compressed power spring 66.

As shown, the inwardly and the outwardly facing receptacles 110, 120 are spaced-apart from the lower edge 63 of the head 60. In addition, it is preferable that the collar 61 continuously abuts the flange case 30, such that the key 100 is inaccessible from between the flange case 30 and the lower edge 63 of the head 60.

The key 100 is preferably made of metal and, even more preferably, the metal is zinc or a zinc alloy.

Preferably, as shown in FIGS. 1 through 5, the outwardly facing receptacle 110 of the flange case 30 is provided in the form of a continuous, annular groove, and the inwardly facing receptacle 120 of the head 60 is provided in the form of a plurality of spaced-apart dimples. Some of the dimples 120 are further provided with injection ports 122.

Although not shown, it should be understood that the inwardly and the outwardly facing receptacles 110, 120 could be provided in many forms. For example, the outwardly facing receptacle 110 could be provided in the form of a plurality of spaced-apart dimples, while the inwardly facing receptacle 120 could be provided in the form of a continuous, annular groove. In addition, either receptacle 110, 120 could be provided in the form of a non-continuous, annular groove, or both receptacles 110, 120 could be provided in the form of non-continuous, annular grooves filled with separate keys 100. As long as the receptacles 110, 120 are substantially aligned or are adjacent, and either the head 60 or the flange case 30 is provided with injection ports for communicating with the receptacles.

Hence, the head 60 cannot be removed from the flange case 30 except by bending, prying, cutting or otherwise deforming or destroying the head. Thus, the opportunity for removing the head 60 is avoided. Not only will field removal be unlikely due to the increased difficulty of removing the head 60, but the prospect of reattaching the head to the flange case 30 without specialized tools provides further deterrence to tampering. In addition, since the key 100 is substantially inaccessible, the possibility of tampering is further reduced.

It should be noted that the present invention is adaptable to virtually any brake actuator wherein a head, which houses a spring is joined to a flange case or the like. Also, it is to be understood that while the present invention is described in connection with a diaphragm spring brake actuator, other fluid brake actuators may be made in accordance with the present invention such as a piston spring brake actuator for example.

Figure 6:
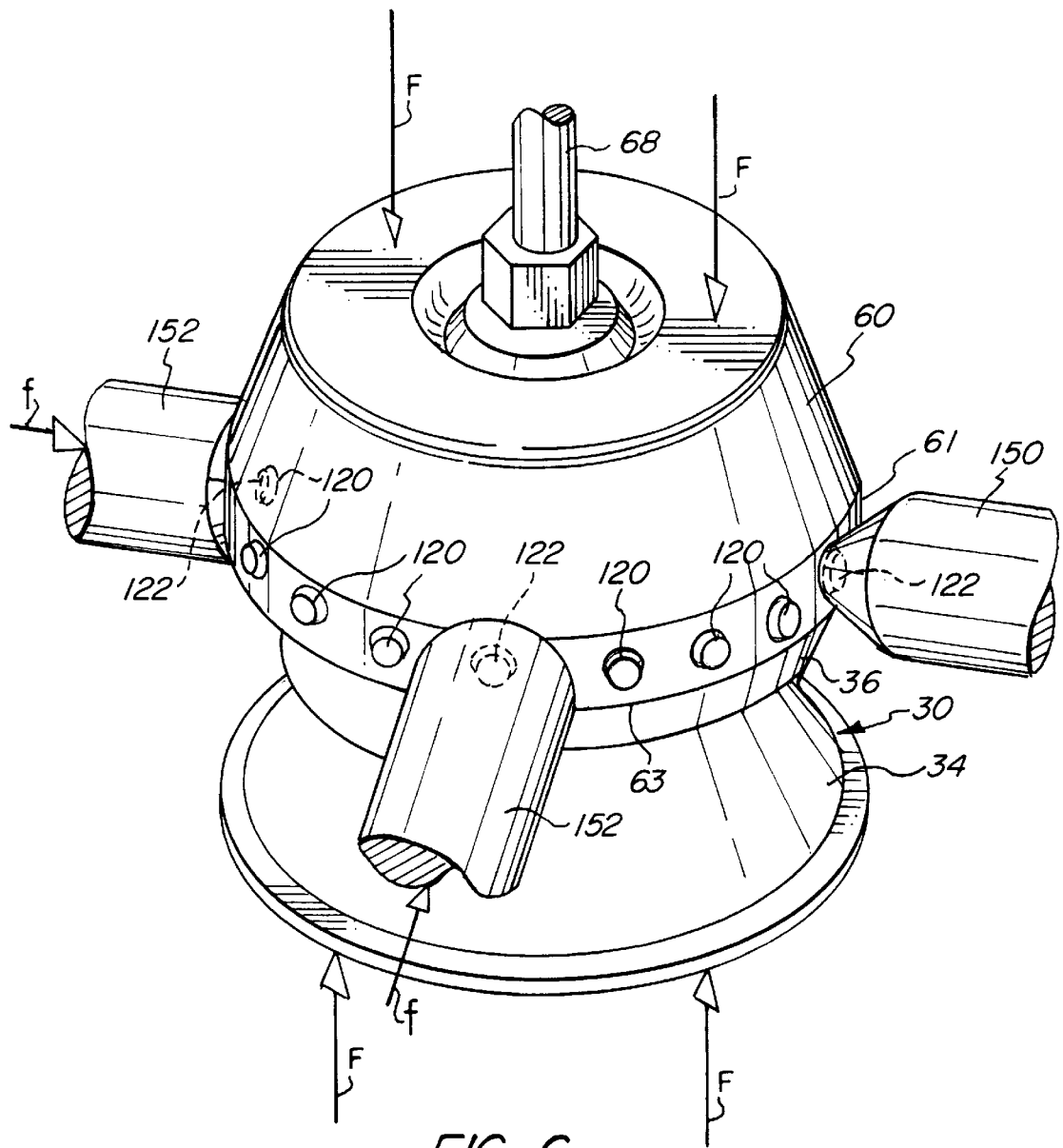
FIG. 6 is an isometric view of a method according to the present invention of securing the head to the flange case of the brake actuator of FIG. 1.

FIG. 6 illustrates a method, according to the present invention, of securing the head 60 to the flange case 30 using die-casting by pressure injection. Methods of die-casting by pressure injection, and machines for die-casting by pressure injection are known to those skilled in the art of die-casting and are disclosed, for example, in U.S. Pat. Nos. 3,701,377, 3,701,378, 3,927,711, and 3,990,501.

The head 60 is first positioned on the flange case 30 such that the inwardly and the outwardly facing receptacles 110, 120 are aligned to form the channel 102. Axial force F is applied to the head 60 and the flange case 30 to compress the power spring 66 there between and prevent the power spring from separating the head from the flange case. The axial force F can vary over a wide range, but generally is more than 1,500 pounds and preferably is in the range of 2,000 to 5,000 pounds.

An injection nozzle 150 of a machine for die-casting by pressure injection (not shown) is then aligned with and pressed against at least one of the injection ports 122, while the remaining ports 122 are each blocked with rams 152 of the machine for die-casting by pressure injection. Radial force f is applied to the rams 152 to block the injection ports 122. Thereafter, molten material is injected under pressure from the nozzle 150, and through the injection port 122 to substantially fill the channel 102. Once the molten material within the channel 102 has been allowed to cool and hardened into the form of the key 100, the nozzle 150 and the rams 152 can be pulled away from the head 60 and the axial force F can be removed from the head and the flange case 30.

In general, the pressure under which the molten material is injected, and the temperature that the molten material is heated to, will be functions of the type of material used and the predetermined volume to be filled by the injection process. The molten material must be injected under sufficient pressure to substantially fill the predetermined volume before the material begins to harden.

The material should be strong when hardened and conducive to pressure injection when melted. Preferably, the material is provided in the form of a metal and, even more preferably, the metal is zinc or a zinc alloy. In addition, the receptacles 110, 120 can be substantially filled or can be partially filled in one injection cycle, and more than one injection nozzle 150 can be employed. If more than one injection cycle is used, the nozzle 150 can be moved to a different injection port 122 for each cycle. It should be noted that the final, hardened key 100 does not have to completely fill the channel 102, as long as there is enough of a key or keys to secure the head 60 to the flange case 30.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A brake actuator comprising:
   a housing including,
      a flange case having an outwardly facing receptacle, and
      a head having a chamber and an inwardly facing receptacle, the head fitting over a portion of the flange case such that the inwardly facing receptacle is adjacent to the outwardly facing receptacle;

a port in the housing in fluid communication with the receptacles; and molten material introduced to said port and substantially filling the inwardly and the outwardly facing receptacles.

2. A brake actuator according to claim 1 wherein the port is located in said head.

3. A brake actuator according to claim 1 wherein the inwardly facing receptacle comprises a plurality of spaced-apart dimples.

4. A brake actuator according to claim 1 wherein the outwardly facing receptacle comprises a continuous, annular groove.

5. A brake actuator according to claim 1 wherein the flange case further includes an outwardly facing groove above the outwardly facing receptacle, and the brake actuator further includes a diaphragm contained within the chamber, the diaphragm having a periphery clamped within the groove in an airtight manner by the head.

6. A brake actuator comprising:

a housing formed from a flange case and a head;

a channel in said housing formed by opposing receptacles of said head and said flange case;

a port in said head in fluid communication with said channel; and a key formed in said channel by introduction of molten material through said port, said key rigidly securing the head to the flange case.

7. A brake actuator comprising:

a housing including,
 a flange case having an outwardly facing receptacle;
 a head having a chamber, a lower edge and an inwardly facing receptacle,
 said inwardly facing receptacle having a plurality of spaced-apart dimples,
 the head fitting over a portion of the flange case such that the inwardly facing receptacle is adjacent the outwardly facing receptacle;

a key substantially filling the inwardly and the outwardly facing receptacles such that the head is rigidly secured to the flange case; and the receptacles spaced-apart from the lower edge of the head, with a portion of the head adjacent the lower edge continuously abutting the flange case such that the key is inaccessible from between the flange case and the lower edge.

8. A brake actuator according to claim 7 further comprising a port within said housing in fluid communication with the receptacles.

9. A brake actuator according to claim 8 wherein the port is located in said head.

10. A brake actuator according to claim 7 wherein the flange case further includes an outwardly facing groove above the outwardly facing receptacle, and the brake actuator further includes a diaphragm contained within the chamber, the diaphragm having a periphery clamped within the groove in an airtight manner by the head.

11. A brake actuator according to claim 7 wherein the outwardly facing receptacle comprises a continuous, annular groove.

12. A method of securing a head of a brake actuator to a flange case of the brake actuator, the method comprising the steps of:

pressing the head and the flange case together until a receptacle of the head is adjacent to a receptacle of the flange case to form a channel;

substantially filling the channel with molten material wherein the molten material is injected into the channel under pressure; and allowing the molten material to harden.

13. A method according to claim 12 wherein the material is metal.

14. A method according to claim 12 wherein the actuator includes a power spring contained between the head and the flange case, with the power spring tending to push the head and the flange case apart, the method further comprising the step of applying sufficient force to hold the head to the flange case until the molten material hardens.

15. A method according to claim 12 wherein the actuator includes injection ports communicating with the channel, the method further comprising the steps of:

injecting the molten material under pressure into one of the injection ports; and blocking the remainder of the injection ports.

16. A method according to claim 15 further comprising the steps of:

injecting the molten material under pressure into another of the injection ports;

blocking the remainder of the injection ports; and allowing the molten material to harden.

* * * * *